(12) United States Patent
Feil et al.

(10) Patent No.: US 9,520,707 B2
(45) Date of Patent: Dec. 13, 2016

(54) DEVICE FOR PROTECTING A USER

(75) Inventors: Wolfgang Feil, Schwandorf (DE); Martin Maier, Erbendorf (DE); Klaus Pfitzner, Amberg (DE); Bernhard Rösch, Sulzbach-Rosenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 239 days.

(21) Appl. No.: 14/394,511

(22) PCT Filed: Apr. 20, 2012

(86) PCT No.: PCT/EP2012/057284
§ 371 (c)(1),
(2), (4) Date: Oct. 15, 2014

(87) PCT Pub. No.: WO2013/156080
PCT Pub. Date: Oct. 24, 2013

(65) Prior Publication Data
US 2015/0049408 A1 Feb. 19, 2015

(51) Int. Cl.
*H01C 7/02* (2006.01)
*H02H 3/08* (2006.01)
(Continued)

(52) U.S. Cl.
CPC ............ *H02H 3/085* (2013.01); *H01H 71/14* (2013.01); *H02H 5/045* (2013.01); *H01H 2011/0068* (2013.01); *H01H 2083/206* (2013.01)

(58) Field of Classification Search
CPC ........ H02H 3/0875; H02H 9/026; H01C 7/02; H01C 7/021

(Continued)

(56) References Cited

U.S. PATENT DOCUMENTS

| 5,546,262 A * | 8/1996 | Baurand | H02H 3/085 318/471 |
| 6,031,703 A * | 2/2000 | Serpinet | H02H 3/085 361/103 |
| 2009/0087725 A1* | 4/2009 | Sim | G01R 1/203 429/90 |

FOREIGN PATENT DOCUMENTS

| DE | 10017372 A1 | 10/2001 |
| JP | H06043186 A | 2/1994 |
| KR | 10-0855263 B1 | 12/2006 |

OTHER PUBLICATIONS

Korean Office Action and English translation thereof dated Jan. 17, 2016.
(Continued)

*Primary Examiner* — Dharti Patel
(74) *Attorney, Agent, or Firm* — Harness, Dickey & Pierce, P.L.C.

(57) ABSTRACT

A device for protecting a user includes a first current path including a first and second conduit, and a monitoring device for detecting an imminent overload of the electric user. In an embodiment, the monitoring device includes a first temperature measurement unit, a support, an evaluation unit and a first transducer to produce an electrically conductive connection between the first and second conduits of the first current path. The first temperature measurement unit is, electrically insulated from the first transducer and includes a first temperature sensor. An additional electrically insulating material; is arranged on a first lateral surface of the support between the first transducer and the support and the first temperature sensor is arranged on the support to detect a temperature of the first transducer. The evaluating unit is configured to detect an imminent overload at the user on the basis of temperatures detected by the first temperature sensor.

20 Claims, 3 Drawing Sheets

(51) Int. Cl.
    *H01H 71/14*     (2006.01)
    *H02H 5/04*     (2006.01)
    *H01H 11/00*     (2006.01)
    *H01H 83/20*     (2006.01)

(58) Field of Classification Search
    USPC ........................................................ 361/93.8
    See application file for complete search history.

(56) References Cited

OTHER PUBLICATIONS

International Search Report PCT/ISA/210 for International Application No. PCT/EP2012/057284 dated Jan. 21, 2013.
Written Opinion of the International Searching Authority PCT/ISA/237 for International Application No. PCT/EP2012/057284 dated Jan. 21, 2013.

\* cited by examiner

DEVICE FOR PROTECTING A USER

PRIORITY STATEMENT

This application is the national phase under 35 U.S.C. §371 of PCT International Application No. PCT/EP2012/057284 which has an International filing data of Apr. 20, 2012, which designated the United States of America, the entire contents of which are hereby incorporated herein by reference.

FIELD

At least one embodiment of the invention generally relates to a device for protecting an electrical load from an overload, in particular a thermal overload.

BACKGROUND

Regarded as a load in this context is in particular an electric motor (e.g. an asynchronous motor). A thermal overload on the load is produced by an excessive current flow. An excessive current flow may be caused, for example, by mechanical overloading of an electric motor or by a failure of one or two current circuits (phases) of the electric motor. This results in undesirable temperature changes at the load, which may ultimately lead to load damage.

To determine imminent thermal overloading of an electrical load, devices are generally incorporated in the phase via which the load is supplied with electrical energy, so that these devices can be used to detect the presence of a thermal overload. Single-phase or even multiphase monitoring can take place, i.e. a single current circuit (one phase) but also a plurality of current circuits (several phases) of the load can be monitored.

For each phase to be monitored, the corresponding devices have a current path along which the energy supplied via the phase is fed. The load's electrical energy therefore passes through the device by way of the current path. The current now of the current path is monitored by way of a monitoring unit of the device so that imminent overloading of the electrical load can be detected. Such devices are, for example, overload relays or circuit breakers. For a downstream load, a circuit breaker provides not only thermal overload protection by way of an A-release, but also short-circuit protection by way of an N-release.

SUMMARY

The device of at least one embodiment of the present application is designed in particular to provide overload protection for a load (e.g. electric motors, lines, transformers and generators).

Different requirements may be placed on a device for detecting thermal overloading of a load:
  The device shall where possible be able to monitor both AC and DC currents, so that both AC and DC loads can be monitored for overload.
  The device shall have as large a setting range as possible. The setting range is the range within which monitoring of the operating current of the electrical load can take place. It is bounded by the upper operating current limit I0 and lower operating current limit IU (I0 to IU). Using a device for adjustment (e.g. a setting screw) on the device, the thermal overload release can be set to the respective rated current of the load, so that selective monitoring of the downstream load to be monitored can take place.
  The device shall produce as little power dissipation as possible.
  The device shall have electrical isolation that is as simple as possible between the current path to be monitored and the monitoring unit that detects the overload.
  The device shall possess a thermal memory. In other words, if imminent thermal overloading of a load is detected, the supply of current to the load is interrupted until cooling of the load has been ascertained. This is designed to prevent immediate reconnection of the load after a thermal overload is detected.

In the event of thermal overloading of a load, there is an increased rate of current rise in the individual current circuits (phases) of the load. By monitoring its current path, an upstream device for monitoring thermal overloading of the load can consequently detect and evaluate this increased rate of current rise. For this purpose different measuring principles can be used. An imminent overload can thus be determined by way of different monitoring units of the device. For each load phase to be monitored, monitoring units for detecting overloading of a load usually comprise a bimetallic release, a current transformer or a shunt on the corresponding current path.

In the case of monitoring by way of a bimetallic release, the current path to be monitored is coupled to a bimetallic release such that the current rise causes heating of the bimetallic release and eventually spatial displacement of part of the bimetallic release. This displacement is detected and further analyzed. A bimetallic release can be used to detect both DC and AC currents. The typical setting range of the bimetallic release 1 to 1.6. The disadvantage of the bimetallic release is that it generates high power dissipation. However, with the bimetallic release, the thermal memory and the electrical isolation between the individual current circuits (phases) are simple to implement.

For monitoring using a current transformer, the respective current transformer determines the current flow of its current path so that an evaluation unit can carry out further analysis of the current flow, and eventually detect an imminent overload. The disadvantage of this measurement method is that DC currents cannot be measured. The setting range is 1 to 10 and dissipation is low. However, a thermal memory cannot be simulated by the current transformer itself.

For monitoring by way of a shunt, the shunt is incorporated in the current path so that a voltage characterizing the current flow can be tapped via the shunt. Downstream analysis of the voltage dropped across the shunt enables an imminent thermal overload to be detected. It is possible to measure AC/DC currents using a shunt method. The setting range is usually 1 to 4. The disadvantage of measurement using a shunt is that no thermal memory is simulated by tapping the voltage at the shunt and the electrical isolation of the individual phases is only possible with great complexity.

At least one embodiment of the invention provides an inexpensive device with which imminent overloading of an electrical load can be detected. In particular, the device shall be able to monitor both direct and alternating currents. In addition, simple electrical isolation of the monitoring unit from the current path to be monitored shall preferably be provided. The device shall preferably be optimized in respect of thermal and electrical stress.

A device of at least one embodiment, i.e. a device for protecting a load, comprises a first current path comprising a first and a second line, and a monitoring unit, for determining imminent overloading of the electrical load, wherein the monitoring unit comprises a first temperature measuring unit, a substrate, an evaluation unit, and a first transducer which establishes an electrically conductive connection between the first and the second lines of the first current path, wherein the first temperature measuring unit is electrically isolated from the first transducer and comprises a first temperature sensor, wherein, on a first lateral surface of the substrate, an additional electrically insulating material is disposed between the first transducer and the substrate, and the first temperature sensor is disposed on the substrate such that it can measure a temperature of the first transducer, wherein the evaluation unit can determine imminent overloading of the load by way of measured temperatures of the first temperature sensor.

Advantageous further developments of the invention are set forth in the disclosure.

The current path is in particular part of a supply feeder to the load. The feeder is also known as the main current path or phase. During active operation of the load (e.g. electric motor), a time-dependent motor current flows through the current path and therefore through the first transducer where it produces defined heating of the first transducer as a function of the magnitude and flow time of the current (current-induced heating). In the event of imminent overloading of electrical load, the thermal behavior of the first transducer compared to the thermal behavior during normal operation of the load is characteristic. In particular, an elevated temperature compared to regular operation is present at the first transducer in the event of an imminent overload. The temperature of the first transducer can be measured by the first temperature measuring unit and in particular the first temperature sensor and made available to the evaluation unit. On the part of the evaluation unit, the characteristic heating behavior of the first transducer can be determined and evaluated on the basis of the measured temperatures of the first temperature sensor so that imminent overloading of the load can be detected therefrom.

The determined temperature of the first transducer is preferably analyzed by the evaluation unit over time so that imminent overloading of the load can be detected therefrom. The heating behavior of the first transducer is preferably evaluated during a defined time interval.

The heating behavior of the first transducer is to be understood as meaning, in particular, the change over time of the temperature, measured by the first temperature sensor, of a temperature measuring point on the first transducer or the change over time of a temperature difference between two or more temperature measuring points (e.g. temperature difference between the temperature of the first transducer and a reference temperature). The current/time characteristic can be inferred from this change in temperature over time or the temperature difference between two temperature measuring points, as the case may be, i.e. the heating behavior. An overload condition on the load can in turn be inferred from this current/time characteristic.

The sampling of the temperature measuring point(s), the determining of any temperature difference, the determining of the change in temperature over time and the inferring of the current/time characteristic or more specifically of the overload condition preferably take place in the evaluation unit.

The substrate is in particular a circuit board. The circuit board is preferably an FR4 circuit board, where "FR" stands for flame retardant and "4" for the components epoxy resin and woven fiberglass.

Depending on the current flowing via the first current path, in particular in the event of an overload or short-circuit, currents which can damage the substrate may arise at the first transducer.

Due to the fact that an additional electrically insulating material is disposed between the substrate and the first transducer, improved electrical insulation of the substrate from the first transducer can be provided, in particular in respect of the maximum currents of the first transducer in the event of a short circuit or overload condition.

The electrically insulating material is in particular implemented additionally to the substrate as a coating on the substrate or as a separate component from the substrate. The additional electrically insulating material thus ensures electrical shielding of the substrate from the transducer.

If the first temperature sensor is disposed on the first lateral surface of the substrate, it is conceivable for the electrically insulating material to be disposed in the region between the temperature sensor and the substrate. It is likewise conceivable for the region between the temperature sensor and the substrate not to be covered with the electrically insulating material and for only the area around the temperature sensor to be covered with the electrically insulating material.

The temperature sensor itself is preferably implemented such that it is electrically isolated from the transducer.

An advantage achieved by at least one embodiment of the invention is in particular that both AC and DC currents can be measured by way of the device. An imminent overload can therefore be detected for AC and DC loads. In addition, an improved setting range can be achieved compared to a bimetallic measuring method. Moreover, a thermal memory can be implemented, as the first transducer is strongly heated in the event of an imminent overload, so that a cooling behavior of the load can be reproduced on the basis of the temperature and therefore cooling of the first transducer. The cooling of the first transducer is preferably analyzed by the evaluation unit so that premature activation of the load can be prevented.

In an advantageous embodiment of the invention, the additional electrically insulating material is disposed directly between the first transducer and the substrate, and the first temperature sensor is disposed on a second lateral surface of the substrate facing away from the first lateral surface.

The first lateral surface of the substrate is preferably oriented parallel to the second lateral surface of the substrate.

In an advantageous embodiment of the invention, the region of the first lateral surface of the substrate that is opposite the first transducer is completely covered with the additional electrically insulating material.

A region lies opposite another element (here the transducer) if a straight line oriented orthogonally to the region intersects the other element. The first and/or second lateral surface is in particular a flat surface.

The electrically insulating material preferably covers the first lateral surface of the substrate completely.

In another advantageous embodiment of the invention, the additional electrically insulating material has a dielectric strength of 10 kV (kilovolts) referred to the overall thickness of the electrically insulating material.

The overall size of the electrically insulating material is in particular the thickness of the electrically insulating material, i.e. the region that is between the substrate and the first transducer.

The dielectric strength of the electrically insulating material is preferably between 10 and 12 kV referred to the overall size of the electrically insulating material.

If the electrically insulating material is disposed between the first transducer and the first temperature sensor, the electrically insulating material must not be made too thick, as the current temperature of the first transducer must always be determinable by the associated temperature sensor disposed on the substrate. The thermal conductivity of the electrically insulating material is therefore preferably designed such that the temperature of the transducer is measurable by the temperature measuring unit such that imminent overloading of the load can be determined.

In another advantageous embodiment of the invention, the additional electrically insulating material can withstand a temperature of 500° C. for at least ten milliseconds and a temperature of 300° C. for at least one minute without mechanical damage.

The substrate is preferably shielded by the electrically insulating material in respect of these temperatures such that the substrate is not subject to mechanical damage.

In the event of a short circuit in a current path, temperatures of up to 500° C. can arise for a few milliseconds. This maximum temperature reduces rapidly in the first 10 to 20 milliseconds. Thereafter, at a level of approx. 200 to 250° C., the temperature decays slowly for a few minutes. In the event of an overload condition, temperatures of up to 300° C. may be present for a few seconds. These temperatures also decay slowly for a few minutes.

The electrically insulating material must withstand this maximum temperature without damage and protect the substrate from the maximum temperatures. If the electrically insulating material is disposed between the temperature sensor and the transducer, the electrically insulating material must pass on the sudden heat rise of the transducer to the temperature sensor so that the evaluation unit is able to determine an overload.

The electrically insulating material is therefore preferably designed to withstand the temperatures occurring due to a short circuit or an overload situation without mechanical damage and also has a thermal conductivity such that, on the one hand, the substrate is protected from mechanical damage due to temperatures occurring at the transducer in the event of a short circuit or overload situation, yet it is possible for the temperature measuring unit to measure the temperature of the transducer so that the evaluation unit can determine an overload on the load by way of the measured temperatures of the temperature measuring unit. These parameters are set in particular via the selection of the electrically insulating material itself as well as the thickness thereof between the transducer and the substrate or more specifically the temperature sensor.

The additional electrically insulating material is preferably mechanically stable.

The additional electrically insulating material is, for example:
  mica,
  as glass layer,
  a polytetrafluoroethylene-coated woven glass,
  a heat-resistant varnish,
  a silicone foil,
  a silicone adhesive tape,
  made of polytetrafluoroethylene,
  a polytetrafluoroethylene foil,
  a polytetrafluoroethylene-coated foil,
  a polytetrafluoroethylene-coated textile tape,
  a polytetrafluoroethylene sintered plastic,
  a ceramic adhesive,
  made of silicone rubber, polyvinylidene fluoride, polyimide, polyamide, polypropylene, polycarbonate or polyether ether ketone (e.g. as a foil or as a strip)
  a ceramic.

It is likewise possible for said materials to be combined with one another.

In another advantageous embodiment of the invention, the evaluation unit can determine a heating behavior over time of the first transducer by way of measured temperatures of the first temperature measuring unit. By analyzing the determined heating behavior over time of the first transducer, the evaluation unit can determine imminent overloading of the load.

In another advantageous embodiment of the invention, the evaluation unit can determine imminent overloading of the load by comparing the determined heating behavior of the first transducer with a reference value stored in the evaluation unit.

The first temperature measuring unit is designed to convey temperatures to the evaluation unit so that the evaluation unit can determine a heating behavior of the first transducer. As a reference value is stored in the evaluation unit, by comparing the determined heating behavior present with the reference value, it is possible to infer the present operating state of the load (evaluation). If an overload is imminent, an excessive current flow and therefore an elevated temperature is present compared to rated operation. The elevated temperature results in a characteristic heating behavior of the first transducer which can be detected by comparison with the stored reference value.

The reference value characterizes in particular the heating behavior of the first transducer as a function of the current flow through the first transducer over time, so that overloading of the load can be detected. By comparing the determined heating behavior of the first transducer with the reference value, a distinction can therefore be made between a heating behavior caused by operation under rated conditions and a heating behavior of the first transducer caused by an imminent overload.

In another advantageous embodiment of the invention, the evaluation unit can output a warning signal, in particular an electrical warning signal, if imminent overloading of the load is detected.

Outputting of the electrical warning signal causes in particular the current flow on the current path to be stopped. In particular, a position of a switching element of the device can be controlled by the warning signal. Either an auxiliary circuit or a main circuit (supply feeder to the electrical load) is directly controlled by the switching element.

If the switching element controls the auxiliary circuit, the switching element is opened or closed so that a switching device (e.g. contactor) switching the main circuit is triggered. Said switching device switching the main circuit then opens the main circuit so that the current now to the load is interrupted, thus preventing overloading of the load.

If the switching element controls the main circuit, the switching element is opened so that the current flow to the load is interrupted, thus preventing overloading of the load.

If a multiphase load is present, by determining an imminent overload on only one current path of the device (and therefore on only one phase of the load) preferably all the phases of the load are opened by the device so that the current flow to the load is interrupted.

In another advantageous embodiment of the invention, the first temperature measuring unit additionally comprises a second temperature sensor, wherein the second temperature sensor can measure a reference temperature, wherein the evaluation unit can determine imminent overloading of the load by way of measured temperatures of the first and second temperature sensor.

In particular the heating behavior of the first transducer can be determined and evaluated by way of the first and second temperature sensor.

The reference temperature can be determined within the device e.g. remotely from the first transducer; i.e. the temperature of the first transducer is not measured by the second temperature sensor. The evaluation unit can therefore determine and evaluate the heating behavior of the first transducer by way of measured temperatures of the first transducer and reference temperatures.

However, it is likewise conceivable for a temperature that is not measured by the first temperature sensor at a temperature measuring point of the first transducer to be measured as the reference temperature. If the reference temperature of the second temperature sensor is a temperature of the first transducer, the second temperature sensor is disposed on the substrate such that it can measure a temperature of the first transducer. For this purpose it is preferably disposed on the second lateral surface of the substrate.

By comparing a measured temperature of the first transducer with a preferably simultaneously measured reference temperature in the evaluation unit, external temperature effects can be very largely eliminated as a fault cause. An exclusively current-induced heating behavior of the first transducer characterizing an overload on the load can therefore be determined by the evaluation unit.

In the event imminent overloading of the load, an excessive current flow and therefore an elevated temperature compared to rated operation of the load is present at the first transducer. The first temperature sensor therefore detects a current-induced elevated temperature. The second temperature sensor determines e.g. a temperature in the device as the reference temperature so that, by comparing the temperature of the first temperature sensor with the reference temperature of the second temperature sensor, the current-induced heating behavior of the first transducer can be determined. Thus it can be inferred that the determined heating behavior of the first transducer is not heating of the first transducer due to an increase in the ambient temperature for the device, but is current induced heating at the first transducer.

Temperature measurement by the first and second temperature sensor preferably takes place simultaneously.

During rated operation of the load, the first transducer preferably exhibits a temperature of approx. 60-100° C. On the other hand, in the event of maximum overloading of the load a temperature of approx. 500° C. may be present at the first transducer.

In another advantageous embodiment of the invention, the first temperature measuring unit comprises a third temperature sensor, wherein the second and third temperature sensor are disposed on the second lateral surface of the substrate, wherein the first, second and third temperature sensor of the first temperature measuring unit can simultaneously measure a temperature of the first transducer in each case, wherein the evaluation unit can determine imminent overloading of the load on the basis of the measured temperatures of the first temperature measuring unit.

In another advantageous embodiment of the invention, the first temperature measuring unit comprises a second and third temperature sensor, wherein the first, second and third temperature sensor are disposed in relation to the first transducer such that the first temperature sensor can measure a temperature at a first measuring point of the first transducer, the second temperature sensor a temperature at a second measuring point of the first transducer and the third temperature sensor a temperature at a third measuring point of the first transducer, wherein, in respect of a first lateral surface of the first transducer, the second measuring point lies between the first and third measuring point on the first lateral surface of the transducer.

In respect of the second lateral surface of the substrate, the second temperature sensor is disposed between the first and third temperature sensor.

The first lateral surface of the transducer preferably lies oppositely parallel to first lateral surface of the substrate.

Only the additional electrically insulating material is preferably disposed between the first lateral surface of the first transducer and the first lateral surface of the substrate.

In another advantageous embodiment of the invention, the first, second and/or third temperature sensor are positioned no more than 2 mm from the first transducer.

In another advantageous embodiment of the invention, the monitoring unit is designed such that the temperature is measured at least twice by the first temperature sensor to determine the heating behavior of the first transducer over time. If the reference temperature is additionally determined by the device (the second temperature sensor is present), the temperature of the first transducer and the reference temperature are preferably measured at least twice, simultaneously to determine the heating behavior of the first transducer. If the third temperature sensor is present, the temperature at the first, second and third transducer is preferably measured at least twice, simultaneously to determine the heating behavior of the first transducer.

In another advantageous embodiment of the invention, the monitoring unit is designed such that the temperature of the first transducer is measured repeatedly at a fixed time interval and then evaluated to determine the heating behavior of the first transducer.

In another advantageous embodiment of the invention, the device additionally comprises a second current path which comprises a first and a second line, wherein the monitoring unit additionally comprises a second temperature measuring unit and a second transducer which establishes an electrically conductive connection between the first and the second line of the second current path, wherein the second temperature measuring unit is electrically isolated from the second transducer and comprises a first temperature sensor, wherein the electrically insulating material is disposed between the second transducer and the substrate on the first lateral surface of the substrate and the first temperature sensor of the second temperature measuring unit is disposed on the substrate such that it can measure a temperature of the second transducer, wherein the evaluation unit can determine imminent overloading of the load by way of measured temperatures of the first temperature sensor of the second temperature measuring unit.

The heating behavior of the second transducer is determined by the evaluation unit in particular by analyzing the measured temperature of the second transducer over time. Here, in addition to the measured temperature of the first temperature sensor, a reference temperature (e.g. the measured temperature of a temperature sensor of the first temperature measuring unit) is preferably determined, in particular simultaneously, and analyzed in this way "non-current-induced" heating at the transducer (e.g. caused by the ambient temperature) remains unconsidered. Imminent overloading of the load can be detected by evaluating the heating behavior determined.

The additional electrically insulating material is preferably disposed directly between the second transducer and the substrate.

The first temperature sensor of the second temperature measuring unit is preferably disposed on the second lateral surface of the substrate.

In another advantageous embodiment of the invention, the device comprises a third current path which comprises a first and a second line, wherein the monitoring unit additionally comprises a third temperature measuring unit and a third transducer which establishes an electrically conductive connection between the first and the second line of the third current path, wherein the third temperature measuring unit is electrically isolated from the third transducer and comprises a first temperature sensor, wherein, on the first lateral surface of the substrate, the additional electrically insulating material is disposed between the third transducer and the substrate and the first temperature sensor of the third temperature measuring unit is disposed on the substrate such that it can measure a temperature of the third transducer, wherein the evaluation unit can determine imminent overloading of the load by way of temperatures of the first temperature sensor of the third temperature measuring unit.

The heating behavior of the third transducer is determined by the evaluation unit in particular by analyzing the measured temperature of the third transducer over time. Here, in addition to the measured temperature of the first temperature sensor, a reference temperature (e.g. the measured temperature of a temperature sensor of the first or second temperature measuring unit) is preferably determined, in particular simultaneously, and analyzed so that "non-current-induced" heating of the third transducer (e.g. caused by the ambient temperature) remains unconsidered. Imminent overloading of the load can be detected by evaluating the heating behavior determined.

The additional electrically insulating material is preferably disposed directly between the third transducer and the substrate.

The first temperature sensor of the third temperature measuring unit is preferably disposed on the second lateral surface of the substrate.

The second and/or third temperature measuring unit can be implemented correspondingly to the first temperature measuring unit, i.e.:
  two or three temperature sensors can be provided for each temperature measuring unit,
  the temperature sensors can be positioned no more than 2 mm away from the corresponding measuring unit, and/or
  the electrically insulating material can be disposed accordingly in respect of the temperature sensor(s) and the associated transducer,
  etc.

It is likewise conceivable for the first and/or second and/or third temperature measuring unit to comprise additional temperature sensors so that the heating behavior at the associated transducer can be determined.

The two lines of the respective current path (first, second or and/or third current path) are preferably connected in an electrically conductive manner solely by way of their associated transducer.

In another advantageous embodiment of the invention, the respective temperature sensor is designed such that it assumes a characteristic electrical state as a function of the temperature present.

The temperature sensor is in particular a thermocouple (e.g. thermo wire), a temperature-dependent semiconductor (e.g. diode, PTC thermistor) or a resistance thermometer (e.g. PT100, PT1000).

If, for example, a diode is used as a temperature sensor, the temperature present can be inferred from a measurement of the voltage across the diode. A temperature change of the transducer would consequently result in a temperature change at the diode, resulting in a voltage change.

In another advantageous embodiment of the invention, the first transducer and any second and/or third transducer is an electrical resistor with temperature-dependent characteristics in each case.

The transducer preferably has constant power dissipation and a characteristic heating curve. The transducer is preferably a shunt.

Part of the heating curve of the respective transducer is preferably present at the evaluation unit as a reference value, so that it can detect an imminent overload by comparing the determined heating behavior with the reference value. The determined heating behavior is thus evaluated. For the comparison with the reference value, in particular the heating behavior of the respective transducer during a defined time interval is considered. The determined temperatures of the respective transducer are therefore analyzed over a defined time interval. If the transducers and the associated temperature sensors of the temperature measuring unit are of identical design, the reference value for the transducers can be made identical.

In another advantageous embodiment of the invention, the device is a switching device, in particular an overload relay or a circuit breaker (e.g. motor circuit breaker, system circuit breaker).

By way of the first, second and/or third temperature sensor, a temperature difference of at least 15 kelvin can be determined by the evaluation unit.

The device is in particular disposed remotely from the load, i.e. it is not a component part of the load (e.g. electric motor).

In another advantageous embodiment of the invention, the dielectric strength of the additional electrically insulating material is greater than that of the substrate material. The layer of additional electrically insulating material disposed parallel to the transducer preferably has a greater dielectric strength than the substrate layer disposed parallel to the transducer.

In another advantageous embodiment of the invention, the transducer comprises carbon material, in particular graphite.

BRIEF DESCRIPTION OF THE DRAWINGS

The invention and embodiments of the invention will now be described and explained in greater detail with reference to the examples illustrated in the accompanying drawings in which.

DETAILED DESCRIPTION OF THE EXAMPLE EMBODIMENTS

Figure 1:
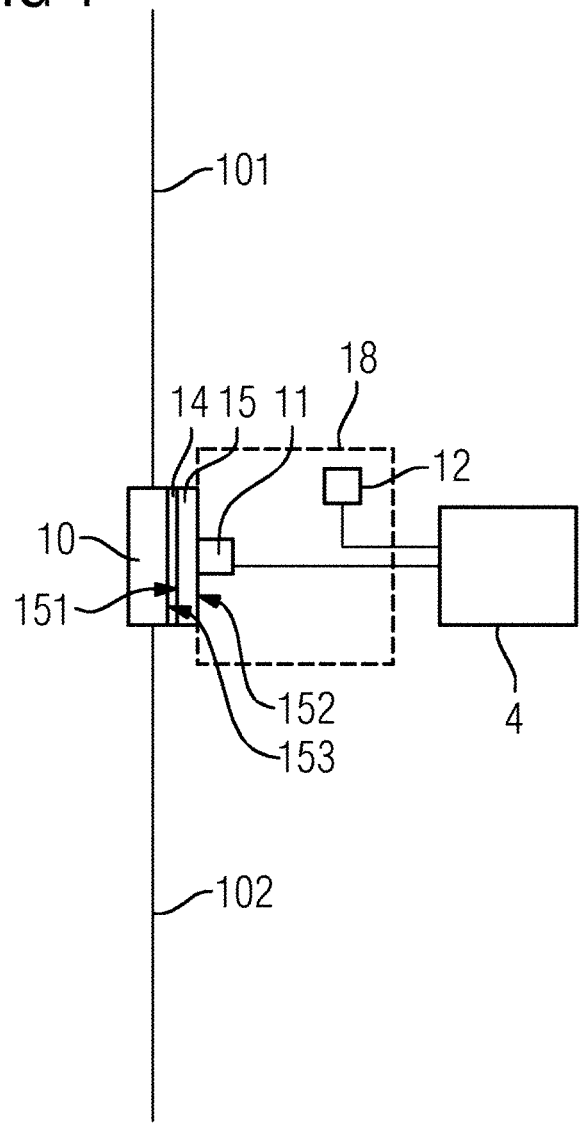
FIG. 1 schematically illustrates a first current path of a device for protecting an electrical load, FIG. 2 schematically illustrates a device for protecting an electrical load, FIG. 3 schematically illustrates an alternative embodiment of a device for protecting an electrical load, and FIG. 4 schematically represents an embodiment of a substrate of the device shown in FIG. 3 for protecting the electrical load.

FIG. 1 schematically illustrates a first current path of a device for protecting an electrical load. The current path shown is a component part of the device for protecting a downstream load. The current path shown comprises a monitoring device by which imminent overloading of the load can be determined. For this purpose the device is incorporated in the current circuit of the load. If, for example, the load is a three-phase AC motor, at least one feeder (phase) of the AC motor has the current path and monitoring device shown.

The first current path comprises a first line 101 and a second line 102. The monitoring unit comprises a first temperature measuring unit 18, a substrate 15, an electrically insulating material 14, an evaluation unit 4 and a first transducer 10. The first temperature measuring unit 18 comprises a first temperature sensor 11 and a second temperature sensor 12, wherein the temperature of the first transducer 10 can be measured using the first temperature sensor 11 and a reference temperature can be measured using the second temperature sensor 12. The second temperature sensor 12 is placed such that another measuring point (other temperature measuring point) can he measured in relation to the first temperature sensor 11. By this, by simultaneously measuring the temperatures of the first and second temperature sensor 11,12, current-induced heating of the first transducer 10 can he determined. The first and second temperature sensor 11,12 is in each case a semiconductor, in particular a diode, so that by measuring the voltage thereof, the temperature present at the corresponding temperature sensor 11,12 can be inferred.

The determined temperatures of the first and second temperature sensor 11,12 are made available to the evaluation unit 4 so that the latter can determine current-induced heating of the first transducer 10. The current-induced heating of the first transducer 10 and therefore the current-induced heating behavior of the first transducer 10 is determined by analyzing the measured temperatures of the first and second temperature sensor 11,12 over time. By way of the temperature sensor 11,12 and the evaluation unit 4, heating of the first transducer 10 by approximately 10 kelvin in the range −10° C. to 200° C. can be determined.

The first transducer 10 is disposed between the first line 101 and the second line 102 of the first current path so that a current can flow from the first line 101 to the second line 102 only via the first transducer 10. As the downstream load is supplied with energy via the first line 101 and second line 102, the current flows via the first transducer 10 during operation of the downstream load. A current magnitude depending on the present operating state of the downstream load is present at the first transducer 10. Defined heating of the first transducer 10 takes place as a function of this current magnitude and the current flow time at the first transducer 10. A characteristic heating behavior is consequently present at the first transducer 10. If the load faces an imminent thermal overload, an excessive current magnitude is present at the first transducer 10. By evaluation of the determined heating behavior of the first transducer 10 by the evaluation unit 4 over a defined time interval, the present state of the downstream load can be inferred. During rated operation, a temperature of approximately 60 to 100° C. is normally present at the first transducer 10. However, if overloading of the load occurs, the increased current flow can cause a temperature of up to 700° C. to be present at the first transducer 10. By monitoring the temperature of the first transducer 10, imminent overloading of the load can therefore be detected. For this purpose the temperature measuring unit 18 comprises the two temperature sensors 11,12.

The first temperature sensor 11 is located no more than 2 mm from the first transducer 10 and can measure the temperature thereof. The first temperature sensor 11 is mounted on a second lateral surface 152 of the substrate 15 (e.g. FR4, ceramic). A first lateral surface 151 of the flat substrate 15 lies oppositely parallel to the second lateral surface 152 of the substrate. The lateral surface 153 of the transducer 10 (first lateral surface 153 of the transducer 10) facing the substrate 15 lies parallel to the first lateral surface 151 of the substrate 15. Between the first lateral surface 153 of the transducer 10 and the first lateral surface 151 of the substrate 15, the additional electrically insulating material 14 (e.g. mica, glass laver, heat-resistant varnish) is disposed directly between the first transducer 10 and the substrate 15.

The region of the first lateral surface 151 of the substrate 15 directly opposite the first lateral surface 153 of the transducer 10 is completely covered by the electrically insulating material 14.

In this way, the additionally electrically insulating material 14 ensures electrical isolation of: the transducer 10 from the substrate 15 and the first temperature sensor 11. The electrically insulating material 14 also protects the substrate 15 from the temperatures of the first transducer 10, in particular in the event of a short circuit or overloading of the load.

The electrically insulating material 14 is in particular heat-resistant and dimensionally stable and also provides high dielectric strength even at high temperatures, thus preventing damage to the substrate 15 and first temperature sensor 11.

The first temperature sensor 11 measures the temperature of the first transducer 10, the second temperature sensor 12 simultaneously measures a reference temperature inside the device, so that the evaluation unit 4 can detect a current-induced heating behavior of the first transducer 10 on the basis of the temperatures measured (temperatures of the first transducer 10 and reference temperatures). In this exemplary embodiment, the first and second temperature sensor 11,12 are placed spatially separated (by more than 0.05 mm) from the first transducer 10. In addition, the second temperature sensor 12 is positioned at least 4 mm from the first temperature sensor 11 so that a current-induced heating behavior of the first transducer 10 can be calculated by the evaluation unit 4. However, it is likewise conceivable for the second temperature sensor 12 to measure the temperature of the first transducer 10 relative to the first temperature sensor 11 at another measuring point of the first transducer 10, so that a heating behavior of the first transducer 10 can be determined.

The first transducer 10 is a metal resistor (shunt) having a characteristic heating curve. Likewise conceivable is a ceramic resistor having a characteristic heating curve. The characteristic heating behavior of the first transducer 10 is available to the evaluation unit 4 as a reference value so that, on the basis of a comparison of the determined present heating behavior of the first transducer 10 with the reference value, in particular during a defined time interval, it can obtain an indication of the present loading state of the load. The evaluation unit 4 can thus continuously monitor a value characterizing the current magnitude and flow time of the first transducer 10, so that motor or more specifically line protection can be derived on the basis of the present heating behavior of the first transducer 10 and thus on the basis of its thermal state. It can therefore be determined whether or not the downstream load is subject to overloading.

The temperature sensors 11,12 can measure the temperature with a high resolution, e.g. to less than 1 kelvin. In this way it is possible to operate with minimal temperature differences and therefore with low electrical resistance values of the first transducer 10. This enables the temperature range to be significantly extended downward in respect of the lower current limit, so that the setting range can be considerably widened compared to the bimetallic solution, for example. A typical value for the necessary temperature in the case of bimetallic solutions is e.g. 50 kelvin overtemperature. While in the case of a solution using the first transducer 10, heating of less 10 kelvin suffices. In this way, setting ranges of up to 1 to 4 can be implemented The evaluation of the current-induced heating behavior of the first transducer 10 via its temperature is largely frequency-independent and therefore suitable for AC and DC applications.

In FIG. 1 only one phase is monitored by the monitoring unit. However, in the case of multiphase loads it is likewise conceivable for each phase or at least two phases to comprise such a temperature measuring unit.

Figure 2:
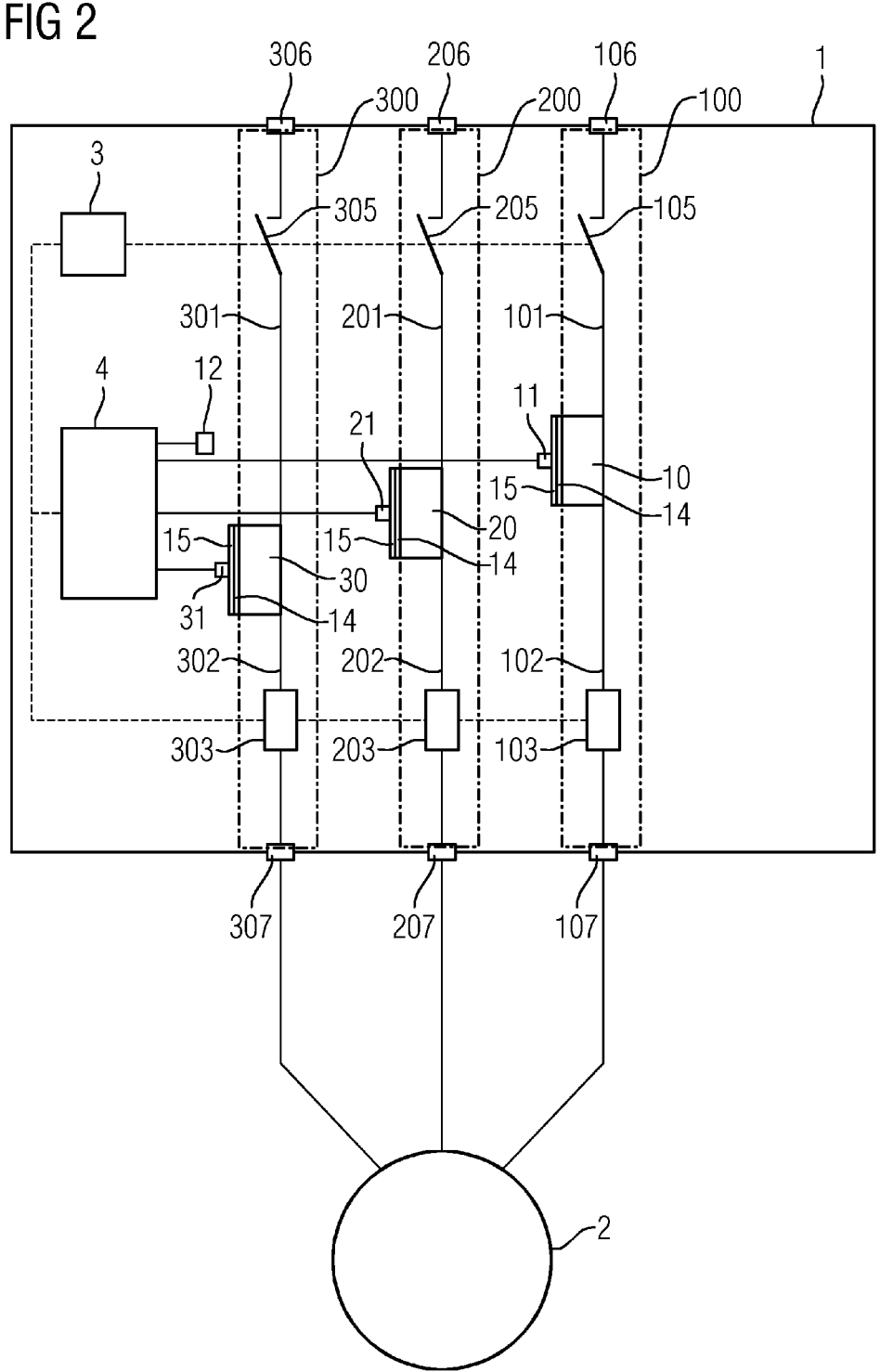

FIG. 2 schematically illustrates a device 1 for protecting an electrical load 2. In this exemplary embodiment, the device 1 is a circuit breaker 1 with which a load 2, namely a three-phase electric motor 2, can be monitored. For this purpose the circuit breaker 1 is inserted in the supply line of the load 2 so that the three phases of the load 2 can be monitored by way of the circuit breaker 1.

To enable the circuit breaker 1 to be incorporated into the supply line of the electrical load 2, it has input-side connection devices 106,206,306 and output-side connection devices 107,207,307. In the circuit breaker 1, the individual phases of the load 2 are therefore electrically isolated. The first phase is mapped via the first current path 100, the second phase is mapped via the second current path 200 and the third phase is mapped via the third current path 300 of the load 2. The current path shown in FIG. 1 corresponds essentially to the first current path 100 of the device 1. For the first phase, the energy flow to the load 2 can be interrupted via a switching element 105 of the first current path 100. The energy flow for the second phase to the load 2 can be interrupted via a switching element 205 of the second current path 200. For the third phase, the energy flow to the load 2 can be interrupted via a switching element 305 of the third current path 300. The switching elements 105,205,305 are controlled via a latching mechanism 3.

The latching mechanism 3 is connected to the evaluation unit 4 and to the short-circuit trip 103 of the first current path 100, the short-circuit trip 203 of the second current path 200 and the short-circuit trip 303 of the third current path 300.

By way of the short-circuit trips 103,203,303 of the respective current paths 100,200,300, a short circuit occurring in the individual current paths and therefore in the individual phases of the load 2 can be detected so that, when a short circuit is detected, the energy supply to the load 2 can be cut off. For this purpose, a corresponding signal is transmitted from the short-circuit trips 103,203,303 to the latching mechanism 3 so that the latter can open the switching elements 105,205,305.

In addition, the circuit breaker has a monitoring device with which imminent overloading of the electrical load 2 can be detected. For this purpose the first current path 100 comprises a first line 101 and a second line 102 as already shown in FIG. 1. Disposed between the first line 101 and the second line 102 is a first transducer 10 which establishes an electrical connection between the two lines 101 and 102. The first transducer 10 is a metal resistor having temperature-independent characteristics. Defined heating of the first transducer 10 takes place as a function of the present current magnitude and current flow time in the first current path 100.

The temperature of the first transducer 10 can be measured by way of a first temperature sensor 11 of the first temperature measuring unit. The measured temperature at the first temperature sensor 11 of the first temperature measuring unit is made available to the evaluation unit 4. The first temperature sensor 11 of the first temperature measuring unit is electrically isolated from the first transducer 10.

The first temperature sensor 11 of the first temperature measuring unit is mounted on the substrate 15. An additional electrically insulating layer 14 is provided between the substrate 15 and the first transducer 10. This electrically insulating layer 14 provides, on the one hand, electrical isolation of the first transducer 10 from the substrate 15 and the first temperature sensor 11 of the first temperature measuring unit. In addition, the electrically insulating layer 14 protects the substrate 15 from thermal damage by the first transducer 10.

The first temperature measuring unit also comprises a second temperature sensor 12 which measures a reference temperature inside the circuit breaker 1. This measurement is likewise made available to the evaluation unit 4. The first temperature sensor 11 and second temperature sensor 12 measure the temperature at different measuring points so that, during active operation of the load 2, current-induced heating of the first transducer 10 can be determined by simultaneous measurements of the temperatures of the first and second temperature sensor 11,12. By comparing the temperatures of the first temperature sensor 11 and second temperature sensor 12 of the first temperature measuring unit, the evaluation unit 4 can determined and evaluate a characteristic heating behavior at the first transducer 10.

Energy is supplied to the second phase of the load 2 via the second current path 200. The second current path 200 likewise has a first line 201 and a second line 202. Disposed between the first and second line 201,202 is a second transducer 20 which provides the electrical connection between the first line 201 and the second line 202. The second transducer 20, like the first transducer 10 of the first current path 100 is a defined resistor which assumes a characteristic thermal state as a function of the current flow occurring and the current flow time present. The temperature of the second transducer 20 can be determined by way of a first temperature sensor 21 of the second temperature measuring unit. The first temperature sensor 21 of the second temperature measuring unit is electrically isolated from the second transducer 20. By comparing the measured temperatures of the second temperature sensor 12 of the first temperature measuring unit with the measured temperatures of the first temperature sensor 21 of the second temperature measuring unit, the evaluation unit 4 can determine the present heating at the second transducer 20. The heating behavior at the second transducer 20 can therefore be analyzed.

The first temperature sensor 21 of the second temperature measuring unit is mounted on the substrate 15. An additional electrically insulating layer 14 is provided between the substrate 15 and the second transducer 20. This electrically insulating layer 14 provides, on the one hand, electrical isolation of the second transducer 20 from the substrate 15 and the first temperature sensor 11 of the second temperature measuring unit. In addition, the electrically insulating layer 14 protects the substrate 15 from thermal damage by the second transducer 20.

The third phase of the load 2 is supplied with energy via the third current path 300 so that third phase can likewise be monitored for overload. The third current path 300 has a first line 301 and a second line 302. Disposed between the first and second line 301,302 is a third transducer 30 which connects the first and second line 301,302 in an electrically conductive manner. A current flowing via the third current path 300 consequently flows via the third transducer 30. Depending on the current magnitude and the current now time on the third phase, characteristic current-induced heating is present at the third transducer 30. To determine the current-induced heating, the temperature of the third transducer 30 is measured. The temperature of the third transducer 30 can be determined by way of a first temperature sensor 31 of a third temperature measuring unit and made available to the evaluation unit 4. The first temperature sensor 31 of the third temperature measuring unit is electrically isolated from the third transducer 30.

The first temperature sensor 31 of the third temperature measuring unit is mounted on the substrate 15. An additional electrically insulating layer 14 is provided between the substrate 15 and the third transducer 30. This electrically insulating layer 14 provides, on the one hand, electrical isolation of the third transducer 30 from the substrate 15 and the first temperature sensor 11 of the third temperature measuring unit. In addition, the electrically insulating layer 14 protects the substrate 15 from thermal damage by the third transducer 30.

The temperature sensors 11,21,33 of the individual current paths are therefore on the same substrate 15. In this exemplary embodiment, the substrate 15 is an FR4 circuit board. The electrically insulating layer 14 is an electrically insulating heat-resistant varnish applied separately to the substrate 15. The electrically insulating layer 14 electrically isolates the substrate 15 from the adjacent transducer 10,20, 30. The electrically insulating layer 14 also prevents thermal damage of the substrate 15 by the transducers 10,20,30.

The individual current paths 100,200,300 consequently each have transducers 10,20,30 which perform characteristic current-induced heating as a function of the current magnitude present and the flow time of the current. The heating behavior as a function of time of the respective transducers 10,20,30 cam be analyzed by monitoring the temperature of the respective transducers 10,20,30 over time. By way of the additional comparison with the reference temperature of the second temperature sensor 12, the analysis of the temperatures of the transducers 10,20,30 can be reduced to the current-induced heating of the transducers 10,20,30.

Instead of determining the heating behavior of the respective transducers 10,20,30 by comparing their temperature with the measured reference temperature of the second temperature sensor 12, it is likewise conceivable for the heating behavior of the respective transducers 10,20,30 to be determined without the reference temperature by analyzing the measured temperatures of the first temperature sensors 11,21,31 of the respective temperature measuring unit over time. By way of the determined current-induced heating of the transducers 10,20,30 it is consequently possible to infer the current now present in the corresponding current path and therefore infer the present operating state of the load 2, as an increased current flow will be present in individual phases of the load in the event of an imminent overload.

The heating characteristic of the first, second and third transducer 10,20,30 is known to the evaluation unit 4 and stored as a reference value. By comparing the current-induced heating behavior of the individual transducers 10,20,30 with the reference value, in particular during a defined time interval, the evaluation unit 4 can consequently determine an imminent overload of the electrical load 2 and initiate appropriate countermeasures. The time interval in which the heating behavior of the respective transducers 10,20,30 is analyzed is preferably selected as a function of the present temperature of the respective transducers 10,20, 30. If an imminent overload of the load 2 is determined, the evaluation unit 4 outputs a warning signal to the latching mechanism 3 so that the switching elements 105,205,305 are opened and therefore the energy now to the load 2 is cut off. In this way, thermal damage to the load 2 due to an overload can be prevented.

As the result of a thermal overload of the load 2 being determined by analyzing the heating behavior of the transducer 10,20,30, the transducer 10,20,30 also provides a thermal memory so as to prevent accidental reconnection of the load shortly after a thermal overload. Only after the transducer 10,20,30 has undergone defined cooling can the load 2 be reconnected to the supply system so that it can be re-supplied with current. Determining the necessary cooling-down of the load by analyzing the temperatures of the transducer 10,20,30 likewise takes place using the temperature sensors 11,12,21,31 and the evaluation unit 4. The evaluation unit 4 likewise has reference values for this purpose.

The device 1 for monitoring thermal overloading of a load 2 has been described in FIG. 2 using a circuit breaker 1 as an example. The device 1 can equally be e.g. an overload relay. In this case the short-circuit trips 103,203 and 303 as well as any latching mechanism 3 and its controlling switching elements 105,205,305 would not be present.

The temperature sensors 11,12,21,31 are in each case semiconductors, in particular diodes, so that, by analyzing the voltage thereof, the temperature at the temperature sensor can be determined. To increase measuring accuracy, a plurality of temperature sensors can also be placed on the transducers 10,20,30. It is likewise conceivable for the second temperature sensor 12 to be placed outside the device 1.

A line requiring protection from thermal overload can also be considered a load 2.

A major advantage of the device 1 and in particular of the monitoring unit is that it provides reliable electrical isolation between the individual phases (current paths 100,200,300) and between the respective temperature sensors 11,21,31 and the current paths 100,200,300.

Figure 3:
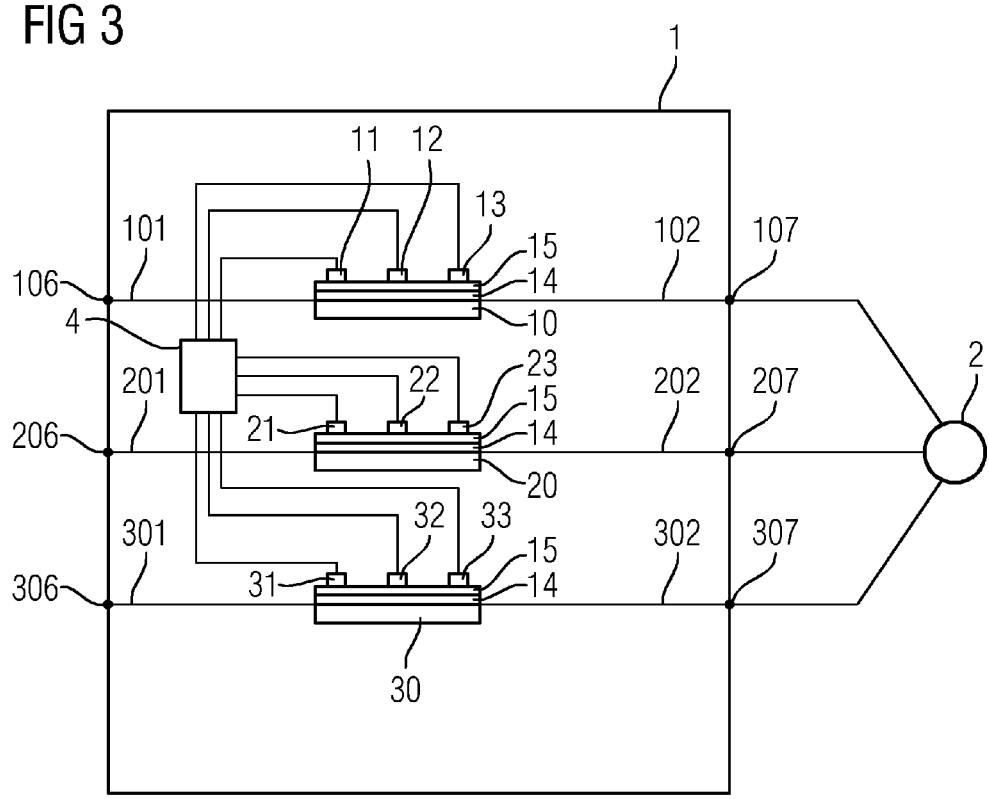

FIG. 3 schematically illustrates an alternative embodiment of a device for protecting an electrical load. In this example, the device 1 is an overload relay 1 with which a load 2, namely a three-phase electric motor, can be monitored. For this purpose the overload relay 1 is inserted in the supply line of the load 2 so that the three phases of the load 2 can be monitored by way of the overload relay 1.

To enable the overload relay 1 to be incorporated in the supply line of the electrical load 2, it has input-side connection devices 106,206,306 and output-side connection devices 107,207,307. In the overload relay 1, the individual phases of the load 2 are electrically isolated. The first phase of the load 2 passes via the first current path, the second phase via the second current path and the third phase via the third current path.

The overload relay 1 has a monitoring unit with which imminent overloading of the electrical load 2 can be detected. Disposed between a first line 101 and a second line 102 is a first transducer 10 which establishes an electrical connection between the two lines 101,102. The first transducer 10 is a metal resistor. Defined heating behavior of the first transducer 10 occurs as a function of the current magnitude present and the flow time of the current in the first current path.

The temperature of the first transducer 10 can be simultaneously measured by way of a first, second and third temperature sensor 11,12,13 of a first temperature measuring unit. The simultaneously measured temperature of the temperature sensors 11,12,13 of the first temperature measuring unit is made available to the evaluation unit 4.

The temperature sensors 11,12,13 of the first temperature measuring unit are mounted on a substrate 15. On the lateral surface facing the first transducer 10, the substrate 15 is provided with an additional electrically insulating material 14, thereby providing reliable electrical isolation of the first transducer 10 from the substrate 15 and the temperature sensors 11,12,13. The electrically insulating material 14 also provides thermal shielding of the substrate 15 with respect to the first transducer 10. The thermal shielding ensures, in particular, that the substrate 15 is not damaged by heating of the first transducer 10 caused by an overload.

Energy is supplied to the second phase of the load 2 via the second current path. The second current path has a first line 201 and a second line 202. Disposed between the first and second line 201 and 202 is a second transducer 20 which provides an electrical connection between the first line 201 and the second line 202. The second transducer 20, like the first transducer 10, is a defined resistor which assumes a characteristic thermal state as a function of the present current flow and current flow time. The temperature distribution at the second transducer 20 can be determined by way of a second temperature measuring unit. For this purpose the second temperature measuring unit comprises a first, second and third temperature sensor 21,22,23.

The temperature of the second transducer 20 be measured simultaneously by way of the first, second and third temperature sensor 21,22,23 13 of the second temperature measuring unit. The simultaneously measured temperature of the temperature sensors 21,22,23 of the second temperature measuring unit is made available to the evaluation unit 4.

The temperature sensors 21,22,23 of the second temperature measuring unit are likewise mounted on the substrate 15. On the lateral surface facing the second transducer 20, the substrate 15 is provided with the additional electrically insulating material 14, thereby providing reliable electrical isolation of the second transducer 10 from the substrate 15 and the temperature sensors 21,22,23. The electrically insulating material 14 also provides thermal shielding of the substrate 15 with respect to the second transducer 20. The thermal shielding ensures, in particular, that the substrate 15 is not damaged by heating of the second transducer 20 caused by an overload.

By comparing the simultaneously measured temperatures of the temperature sensors 21,22,23 of the second temperature measuring unit with a reference value stored in the evaluation unit 4, which reference value characterizes a thermal behavior of the second transducer 20 that is characteristic of an imminent overload, the evaluation unit 4 can determine the present current-induced thermal state of the second transducer 20 and thus detect imminent overloading of the load.

Energy is supplied to the third phase of the load 2 via the third current path so that the third phase can be monitored for overload. The third current path has a first line 301 and a second line 302. Disposed between the first and second line 301,302 is a third transducer 30 which connects the first and second line 301,302 in an electrically conductive manner. A current flowing via the third current path consequently flows via the third transducer 30. A characteristic current-induced heating behavior is present at the third transducer 30 as a function of the magnitude and flow time of the current in the third phase. To determine the current-induced heating behavior, the temperature of the third transducer 30 is measured simultaneously at three measuring points by way of three temperature sensors 31,32,33. The measured temperature is supplied to the evaluation unit 4 for further analysis.

The temperature sensors 31,32,33 of the third temperature measuring unit are likewise mounted on the substrate 15. On the lateral surface facing the third transducer 20, the substrate 15 is provided with the electrically insulating material 14, thereby providing reliable electrical isolation of the third transducer 30 from the substrate 15 and the temperature sensors 31,32,33. The electrically insulating material 14 also provides thermal shielding of the substrate 15 with respect to the third transducer 30. The thermal shielding ensures, in particular, that the substrate 15 is not damaged by heating of the third transducer 30 caused by an overload.

The first, second and third transducer 10,20,30 as well as the first, second and third temperature measuring unit are of identical design in each case. The determined temperatures of the first, second and third temperature measuring unit can consequently be uniformly evaluated. A ceramic resistor having a characteristic heating curve is likewise conceivable as the first, second and third transducer 10,20,30.

The individual current paths consequently each have a transducer 10,20,30 which is subject to characteristic current induced heating as a function of the present magnitude and flow time of the current. By monitoring the current-induced thermal behavior of the respective transducers 10,20,30 and comparing it with a stored reference value, the current flow present in the corresponding current path and therefore the present operating state of the load 2 can be inferred, so that imminent overloading of the load 4 can be deduced by the evaluation unit 4.

The heating characteristic of the first, second and third transducer 10,20,30 is known to the evaluation unit 4 and stored as a reference value so that the evaluation unit 4 can determine imminent overloading of the electrical load 2 by comparing the determined temperatures of the first, second and/or third temperature measuring unit with the reference value. If imminent overloading of the load 2 is determined, the evaluation unit 4 outputs a warning signal so that switching elements (not shown) of the load 2 are operated, thereby cutting of the energy supply to the load 2. In this way, thermal damage to the load 2 in respect of overload can be prevented by the device 1.

Due to the fact that thermal overloading of the load 2 is determined by heating of the transducer 10,20,30, the transducer 10,20,30 also has a thermal memory so that unintentional re-connection of the load cannot occur shortly after a thermal overload. Only after the transducers 10,20,30 have undergone defined cooling can the load 2 be reconnected to the supply so that it can be re-supplied with current. The necessary cooling of the load can be determined by analyzing the temperatures of the transducers 10,20,30. For this purpose the temperature of the transducer 10,20,30 affected is determined on the part of the respective temperature measuring unit and analyzed on the part of the evaluation unit 4. The evaluation unit 4 likewise has cooling reference values for this purpose.

The temperature sensors 11,12,13,21,22,23,31,32,33 are in each case semiconductors, in particular diodes, so that, by analyzing the voltages thereof, the temperature at the temperature sensor and therefore at the associated measuring point of the corresponding transducer 10,20,30 can be determined. To increase the measuring accuracy, a plurality of temperature sensors can also be placed on the transducers 10,20,30.

Figure 4:
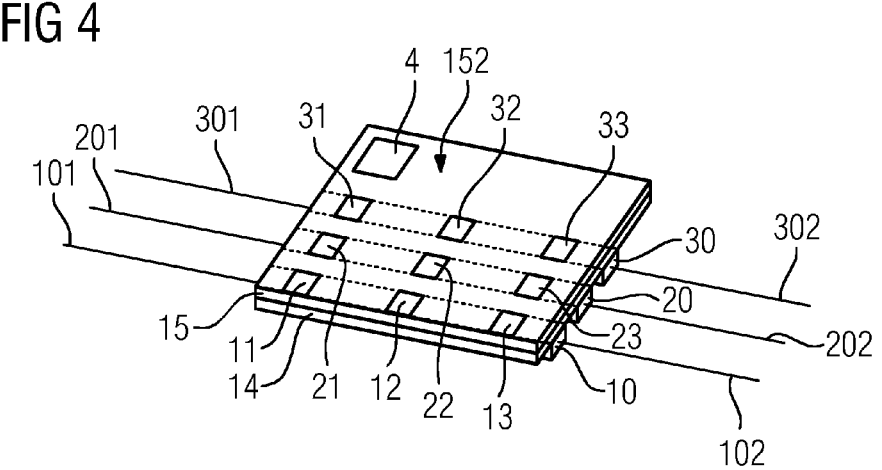

FIG. 4 schematically illustrate an embodiment of a substrate 15 of the device 1 shown in FIG. 3 for protecting the electrical load 2. The monitoring unit is mounted on the substrate 15 which is an FR4 circuit board. The first, second and third temperature measuring unit and the evaluation unit 4 are mounted on a second lateral surface 152 of the substrate 15. The transducers 10,20,30 are disposed on the first lateral surface of the substrate 15 oppositely parallel to the second lateral surface 152. The first lateral surface of the substrate 15 is completely covered with an additional electrically insulating material 14. The material 14 therefore constitutes an electrically and thermally insulating layer between the transducers 10,20,30 and the substrate 15.

The first transducer 10 is disposed on the first lateral surface of the substrate 15 and is connected on the input side to a line 101 and on the output side to a line 102. A downstream load is supplied with energy via this first current path (first phase).

The second transducer 20 is disposed on the first lateral surface of the substrate 15 and is connected on the input side to a line 201 and on the output side to a line 202. A downstream load is supplied with energy via this second current path (second phase).

The third transducer 30 is disposed on the first lateral surface of the substrate 15 and is connected on the input side to a line 301 and on the output side to a line 302. A downstream load is supplied with energy via this third current path (third phase).

The first, second and third temperature measuring unit and the evaluation unit 4 are mounted on the second lateral surface of the substrate 15. The first, second and third temperature measuring unit and the evaluation unit 4 are electrically isolated from the transducers 10,20,30 by the substrate 15 and the electrically insulating layer 14.

The first temperature measuring unit comprises three temperature sensors 11,12,13, wherein two temperature sensors 11,13 are disposed in the edge region (beginning and end) of the longitudinal axis of a lateral surface of the first transducer 10 and a temperature sensor 12 is disposed in the center of the longitudinal axis of the lateral surface of the first transducer 10. The heating of the first transducer 10 can be determined in this way.

The second temperature measuring unit comprises three temperature sensors 21,22,23, wherein two temperature sensors 21,23 are disposed in the edge region (beginning and end) of the longitudinal axis of a lateral surface of the second transducer 20 and a temperature sensor 22 is disposed in the center of the longitudinal axis of the lateral surface of the second transducer 20. The heating of the second transducer 20 can be determined in this way.

The temperature sensors 31,32,33 of the third temperature measuring unit are disposed opposite the third transducer 30 in equivalent manner to the temperature sensors of the first temperature measuring unit opposite the first transducer 10.

The fact that the temperature sensors 11,12,13,21,22,23, 31,32,33 are disposed on the opposite lateral surface of the circuit board 5 with respect to the transducer 10,20,30 ensures good thermal coupling between the temperature sensors 10,11,12,21,22,23,31,32,33 and the associated transducers 10,20,30 while simultaneously providing electrical isolation. The substrate 15 is better screened thermally and electrically from the transducers 10,20,30 by the additional electrically insulating material 14 between the transducers 10,20,30 and the substrate 15.

The invention claimed is:

1. A device for protecting a load, comprising
a first current path including a first and a second line; and
a monitoring unit, to determine imminent overloading of the electrical load,
the monitoring unit including
a first temperature measuring unit,
a substrate,
an evaluation unit, and
a first transducer, to establish an electrically conductive connection between the first and second line of the first current path, wherein the first temperature measuring unit is electrically isolated from the first transducer and comprises a first temperature sensor, wherein on a first lateral surface of the substrate, an additional electrically insulating material is disposed between the first transducer and the substrate, and the first temperature sensor is disposed on the substrate so as to be able to measure a temperature of the first transducer, and wherein the evaluation unit is configured to determine imminent overloading of the load by of way measured temperatures of the first temperature sensor.

2. The device of claim 1, wherein the additional electrically insulating material is disposed directly between the first transducer and the substrate and the first temperature sensor is disposed on a second lateral surface of the substrate facing away from the first lateral surface.

3. The device of claim 2, wherein the first temperature measuring unit additionally comprises a second temperature sensor, wherein the second temperature sensor is configured to measure a reference temperature, and wherein the evaluation unit is configured to determine imminent overloading of the load by way of measured temperatures of the first and second temperature sensor.

4. The device of claim 3, wherein the first temperature measuring unit comprises a third temperature sensor, wherein the second and third temperature sensor are disposed on the second lateral surface of the substrate, wherein the first, second and third temperature sensor of the first temperature measuring unit are each configured to simultaneously measure a temperature of the first transducer, and wherein the evaluation unit is configured to determine imminent overloading of the load on the basis of the measured temperatures of the first temperature measuring unit.

5. The device of claim 2, wherein the device is a switching device.

6. The device of claim 1, wherein a region of the first lateral surface of the substrate, opposite the first transducer, is completely covered with the additional electrically insulating material.

7. The device of claim 1, wherein the additional electrically insulating material has a dielectric strength von 10 kilovolts referred to the overall thickness of the electrically insulating material.

8. The device of claim 1, wherein the additional electrically insulating material withstands a temperature of 500° C. for at least ten milliseconds and a temperature of 300° C. for at least one minute without mechanical damage.

9. The device of claim 1, wherein the evaluation unit is configured to determine a heating behavior over time of the first transducer by way of measured temperatures of the first temperature measuring unit and is configured to determine imminent overloading of the load by analyzing the determined heating behavior over time of the first transducer.

10. The device of claim 9, wherein the evaluation unit is configured to determine imminent overloading of the load on the basis of a comparison of the determined heating behavior of the first transducer with a reference value stored in the evaluation unit.

11. The device of claim 1, wherein the first temperature measuring unit comprises a second and third temperature sensor, wherein the first, second and third temperature sensor are disposed with respect to the first transducer such that the first temperature sensor is configured to measure a temperature at a first measuring point of the first transducer, the second temperature sensor a temperature at a second measuring point of the first transducer and the third temperature sensor a temperature at a third measuring point of the first transducer, and wherein with respect to a first lateral surface of the first transducer, the second measuring point is between the first and third measuring point on the first lateral surface of the transducer.

12. The device of claim 1, wherein the temperature sensor is no more than 2 mm away from the first transducer.

13. The device of claim 1, further comprising a second current path which comprises a first and a second line, wherein the monitoring unit additionally includes a second temperature measuring unit and a second transducer to establish an electrically conductive connection between the first and the second line of the second current path, wherein the second temperature measuring unit is electrically isolated from the second transducer and comprises a first temperature sensor, wherein, on the first lateral surface of the substrate, the additional electrically insulating material is disposed between the second transducer and the substrate and the first temperature sensor of the second temperature measuring unit is disposed on the substrate to measure a temperature of the second transducer, and wherein the evaluation unit is configured to determine imminent overloading of the load by way of measured temperatures of the first temperature sensor of the second temperature measuring unit.

14. The device of claim 13, further comprising a third current path which comprises a first and a second line, wherein the monitoring unit additionally comprises a third temperature measuring unit and a third transducer which establishes an electrically conductive connection between the first and the second line of the third current path, wherein the third temperature measuring unit is electrically isolated from the third transducer and comprises a first temperature sensor, wherein, on the first lateral surface of the substrate, the electrically insulating material is disposed between the third transducer and the substrate and the first temperature sensor of the third temperature measuring unit is disposed on the substrate to measure a temperature of the third transducer, wherein the evaluation unit is configured to determine imminent overloading of the load by way of measured temperatures of the first temperature sensor of the third temperature measuring unit.

15. The device of claim 14, wherein at least one of the first transducer, second and third transducer includes a resistor having a defined heating curve.

16. The device of claim 1, wherein the device is a switching device.

17. The device of claim 16, wherein the switching device is an overload relay or a circuit breaker.

18. The device of claim 1, wherein the first temperature measuring unit additionally comprises a second temperature sensor, wherein the second temperature sensor is configured to measure a reference temperature, and wherein the evaluation unit is configured to determine imminent overloading of the load by way of measured temperatures of the first and second temperature sensor.

19. The device of claim 1, further comprising a third current path which comprises a first and a second line, wherein the monitoring unit additionally comprises a third temperature measuring unit and a third transducer which establishes an electrically conductive connection between the first and the second line of the third current path, wherein the third temperature measuring unit is electrically isolated from the third transducer and comprises a first temperature sensor, wherein, on the first lateral surface of the substrate, the electrically insulating material is disposed between the third transducer and the substrate and the first temperature sensor of the third temperature measuring unit is disposed on the substrate to measure a temperature of the third transducer, wherein the evaluation unit is configured to imminent overloading of the load by way of measured temperatures of the first temperature sensor of the third temperature measuring unit.

20. The device of claim 1, wherein the first transducer includes a resistor having a defined heating curve.

* * * * *